(12) United States Patent
Nako et al.

(10) Patent No.: US 12,397,990 B2
(45) Date of Patent: Aug. 26, 2025

(54) AUTOMATED WAREHOUSE SYSTEM, AND CONTROL METHOD FOR AUTOMATED WAREHOUSE SYSTEM

(71) Applicant: MURATA MACHINERY, LTD., Kyoto (JP)

(72) Inventors: Taisuke Nako, Inuyama (JP); Tsuyoshi Kakinuki, Inuyama (JP); Takahiro Sakai, Inuyama (JP)

(73) Assignee: MURATA MACHINERY, LTD., Kyoto (JP)

( * ) Notice: Subject to any disclaimer, the term of this patent is extended or adjusted under 35 U.S.C. 154(b) by 557 days.

(21) Appl. No.: 17/907,999

(22) PCT Filed: Feb. 25, 2021

(86) PCT No.: PCT/JP2021/007101
§ 371 (c)(1),
(2) Date: Aug. 30, 2022

(87) PCT Pub. No.: WO2021/177135
PCT Pub. Date: Sep. 10, 2021

(65) Prior Publication Data
US 2023/0089547 A1 Mar. 23, 2023

(30) Foreign Application Priority Data
Mar. 2, 2020 (JP) .................. 2020-034896

(51) Int. Cl.
*B65G 1/04* (2006.01)
*B65G 1/137* (2006.01)
(Continued)

(52) U.S. Cl.
CPC ......... *B65G 1/0492* (2013.01); *B65G 1/1378* (2013.01); *G05D 1/0291* (2013.01); *G06Q 10/08* (2013.01); *G06Q 10/087* (2013.01)

(58) Field of Classification Search
CPC .... G06Q 10/08; G06Q 10/087; B65G 1/1378; B65G 1/0492
See application file for complete search history.

(56) References Cited

U.S. PATENT DOCUMENTS

| | | | |
|---|---|---|---|
| 2016/0101940 A1* | 4/2016 | Grinnell | G05D 1/0289 700/218 |
| 2022/0398528 A1* | 12/2022 | Gupta | G06Q 10/063 |
| 2024/0150125 A1* | 5/2024 | Schedlbauer | B65G 1/0492 |

FOREIGN PATENT DOCUMENTS

| | | |
|---|---|---|
| JP | 11-116006 A | 4/1999 |
| WO | 2018/168060 A1 | 9/2018 |

* cited by examiner

*Primary Examiner* — Timothy R Waggoner
(74) *Attorney, Agent, or Firm* — Keating & Bennett, LLP

(57) ABSTRACT

An automated warehouse system includes automated warehouses, work stations, a travel route, automated guided vehicles, and a controller. The travel route is accessible to the automated warehouses and the work stations. The automated guided vehicles travel along the travel route. The controller determines an area including at least a portion of the travel route as a travel area in which the automated guided vehicle travels, and controls the automated guided vehicle to transport an article between the automated warehouse and the work stations belonging to the travel area. The controller determines size of the travel area, in which the automated guided vehicle travels, based on the operating status of at least one of the automated warehouse and the work station.

8 Claims, 7 Drawing Sheets

(51) Int. Cl.
*G05D 1/00* (2024.01)
*G06Q 10/08* (2024.01)
*G06Q 10/087* (2023.01)

AUTOMATED WAREHOUSE SYSTEM, AND CONTROL METHOD FOR AUTOMATED WAREHOUSE SYSTEM

BACKGROUND OF THE INVENTION

1. Field of the Invention

The present invention relates to an automated warehouse system including an automated warehouse, a station, and a plurality of automated guided vehicles that travel between the automated warehouse and the station. It also relates to a control method of the automated warehouse system.

2. Description of the Related Art

Conventionally, there is known an automated warehouse system that includes an automated warehouse, a station, and an automated guided vehicle that transports an article between the automated warehouse and the station (see, for example, JP-A-H11-116006). In addition, in the automated warehouse system described above, many automated warehouses and stations are provided, and the many automated guided vehicles transport articles between the automated warehouse and the station.

SUMMARY OF THE INVENTION

In the automated warehouse system described above, an operating status of the automated warehouse and/or the station may be changed. In a conventional automated warehouse system, the automated guided vehicle travels within an area that is fixed and determined in advance. Therefore, if a transport command that exceeds a transport capacity of articles of the automated guided vehicle in the area is issued in the area, the article transport command requested in the area remains unprocessed. On the other hand, if there are a few article transport commands in the area, the number of the automated guided vehicles that are not working increases, and hence the transport capacity of articles of the automated warehouse system cannot be fully used.

In addition, if many automated guided vehicles travel between the automated warehouse and the station, and if travel frequency per automated guided vehicle becomes high, it is necessary to travel between the automated warehouse and the station along a route that is not shortest, in order to avoid collision between automated guided vehicles, for example. In addition, it is necessary to wait for another automated guided vehicle to pass. Thus, an transport efficiency of articles between the automated warehouse and the station may be lowered.

As a result, a difference in operating status of the automated guided vehicles and the transport efficiency of articles may be caused between the case of a high operating ratio and a case of a low operating ratio of the automated warehouse and/or the station, and hence the automated warehouse system cannot be operated with high efficiency equally in the case of a high operating ratio and in the case of a low operating ratio of the automated warehouse and/or the station.

Preferred embodiments of the present invention reduce an influence on an operating status of an automated warehouse and/or on a station of the operating status of the automated guided vehicle, in an automated warehouse system including the automated warehouse, the station, and the automated guided vehicles that transport articles between the automated warehouse and the station.

A plurality of aspects of various preferred embodiments of the present invention are described below and can be arbitrarily combined as necessary or desired.

An automated warehouse system according to an aspect of a preferred embodiment of the present invention includes a plurality of automated warehouses, a plurality of work stations, a travel route, a plurality of automated guided vehicles, and a controller.

The travel route is accessible to the plurality of automated warehouses and the plurality of work stations. The automated guided vehicles are capable of traveling along the travel route.

The controller is configured or programmed to determine an area including at least a portion of the travel route as a travel area in which the automated guided vehicle travels, and control the automated guided vehicle to transport an article between the automated warehouse and the work station belonging to the travel area.

In addition, the controller is configured or programmed to determine a size of the travel area in which the automated guided vehicle travels, based on the operating status of at least one of the automated warehouse and the work station.

In the automated warehouse system described above, the size of the travel area is determined based on the operating status of at least one of the automated warehouse and the work station. In this way, it is possible to reduce an influence of the operating status of the automated warehouse and/or the station on the operating status of the automated guided vehicle.

The areas determined by the controller may include a plurality of reference areas. In this case, the controller may change the size of the travel area by integrating a plurality of neighboring reference areas or dividing the travel area into the reference areas, based on the operating status of at least one of the automated warehouse and the work station.

In this way, the size of the travel area can be changed by an easy process.

When setting a plurality of travel areas, the controller may determine the sizes of the travel areas such that the operating status of at least one of the automated warehouse and the work station belonging to each travel area becomes close.

As the operating status of the automated warehouse and/or the work station becomes close among all the travel area, the operating status of the automated guided vehicle can be uniform or substantially uniform among all the travel areas.

The controller may determine a ratio of a number of the automated warehouses to a number of the work stations that transport the article between the automated guided vehicle belonging to the travel area, to be larger in the larger travel area, before and after changing the size of the travel area.

In this way, if a large travel area is set because of a low operating ratio of the automated warehouse and/or the work station, the number of the work stations in working state can be reduced in accordance with the decrease in the operating ratio.

The travel area may include neighboring first and second travel areas.

In this case, the controller may determine one of the work stations belonging to the first travel area, which is located on the side closest to the second travel area, as a first work station, determine one of the work stations belonging to the second travel area, which is located on the side closest to the first travel area, as a second work station, and control the automated guided vehicle to transport the article between the first work station and the automated warehouse and between the second work station and the automated warehouse.

In this way, the work stations belonging to two travel areas can be operated by the same worker. As a result, the number of workers allocated to the automated warehouse system can be reduced.

Each automated warehouse may have a transport device that transports the article in the automated warehouse. In this case, the controller may reduce the travel area if an operating ratio of the transport device in the plurality of automated warehouses is high, and the controller may enlarge the travel area if the operating ratio of the transport device in the plurality of automated warehouses is low.

In this way, an influence of the operating status of the automated warehouse is reduced so that efficiency of loading and unloading in the automated warehouse system can be improved.

The controller may reduce the travel area if the operating ratio of the plurality of automated guided vehicles is high, the controller may enlarge the travel area if the operating ratio of the plurality of automated guided vehicles is low.

In this way, the transport efficiency of articles by the automated guided vehicle is improved so that efficiency of storage and retrieval in the automated warehouse system can be improved.

A method according to another aspect of a preferred embodiment of the present invention is a method for controlling an automated warehouse system. The automated warehouse system includes a plurality of automated warehouses, a plurality of work stations, a travel route provided so as to be accessible to the plurality of automated warehouses and the plurality of work stations, and a plurality of automated guided vehicles configured to travel along the travel route. The method for controlling the automated warehouse system includes determining an area including at least a portion of the travel route as a travel area in which the automated guided vehicle travels, and controlling the automated guided vehicle to transport the article between the work station and the automated warehouse belonging to the travel area.

In the control method described above, the travel area has a size determined based on an operating status of at least one of the automated warehouse and the work station.

In the control method described above, the size of the travel area is determined based on the operating status of at least one of the automated warehouse and the work station. In this way, it is possible to reduce an influence of the operating status of the automated warehouse and/or the station on the operating status of the automated guided vehicle.

As the influence of the operating status of the automated warehouse and/or the station on the operating status of the automated guided vehicle can be reduced, even if the operating status of the automated warehouse and/or the station changes, the automated warehouse system can be operated at high efficiency continuously.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
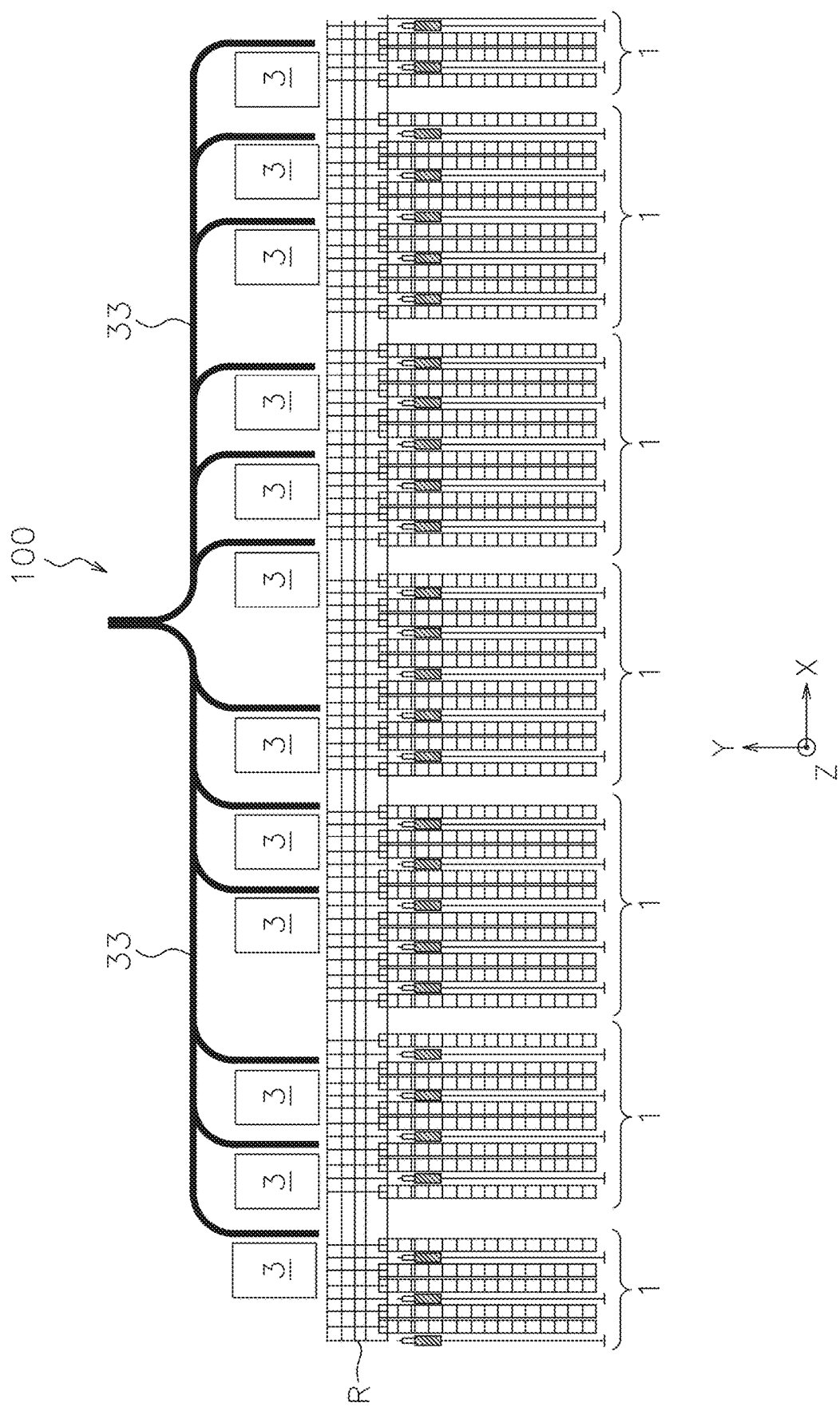
FIG. 1 is a schematic plan view of a whole automated warehouse system according to a first preferred embodiment of the present invention.
Figure 2:
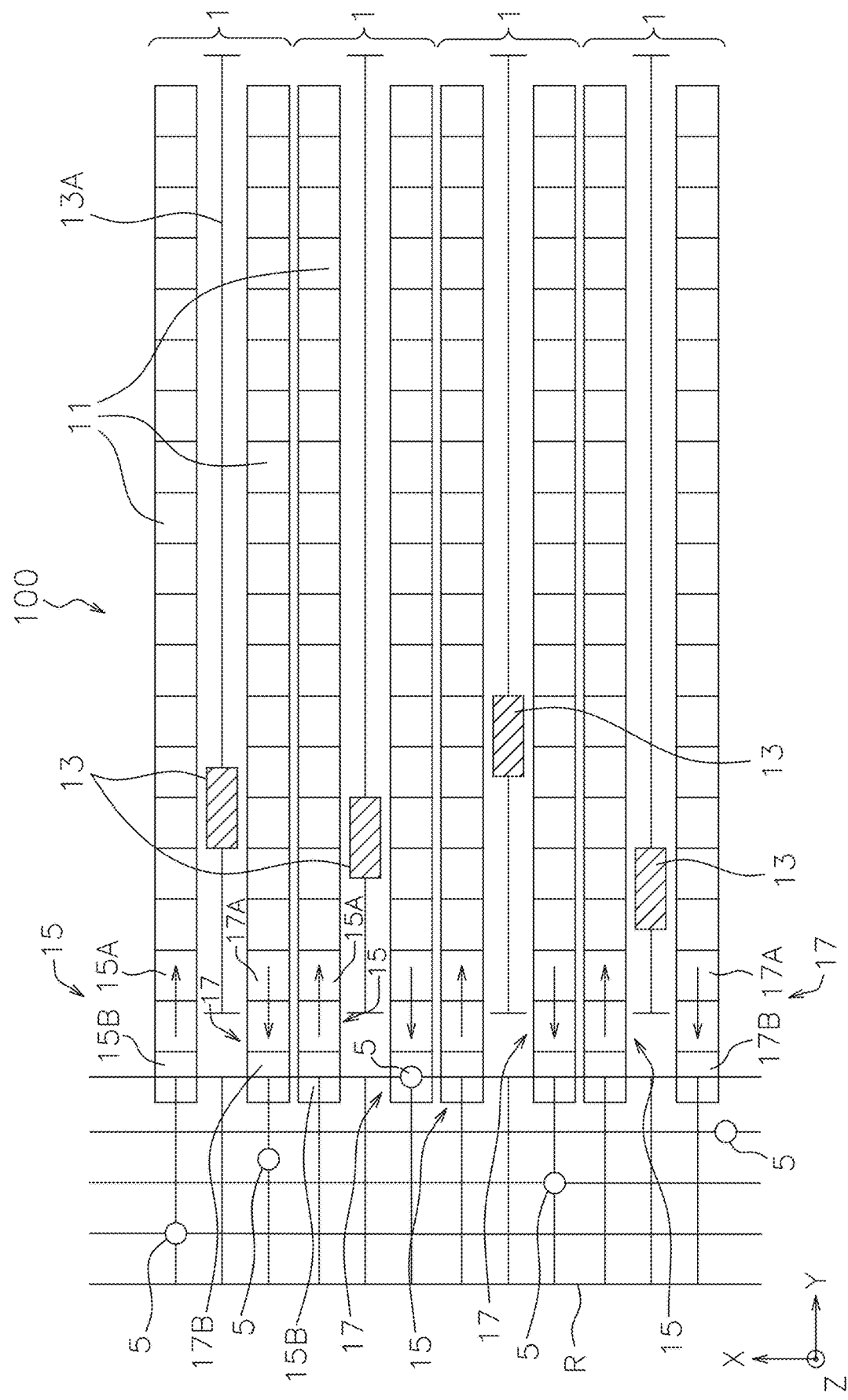
FIG. 2 is an enlarged plan view of a portion of the automated warehouse system.

1. First Preferred Embodiment (1) Entire Structure of Automated Warehouse System With reference to FIGS. 1 and 2, an automated warehouse system 100 is described. FIG. 1 is a schematic plan view of the entire automated warehouse system 100 according to a first preferred embodiment. FIG. 2 is an enlarged plan view of a portion of the automated warehouse system 100.

The automated warehouse system 100 is a system including a plurality of automated warehouses 1, a plurality of work stations 3, and a plurality of automated guided vehicles 5. The automated warehouse system 100 is installed in a factory, a distribution center, or the like, for example. In the automated warehouse system 100, loading of an article to the automated warehouse 1 from the work station 3, and unloading of an article from the automated warehouse 1 to the work station 3 are performed. When loading or unloading the article, transport of the article is performed between the work station 3 and the automated warehouse 1. The plurality of automated guided vehicles 5 perform the transport of the article.

In the following description, the X direction (the arrow X direction) is an arrangement direction of the plurality of automated warehouses 1, and the Y direction (the arrow Y direction) is a direction perpendicular to the X direction on the horizontal plane. In addition, the Z direction (the arrow Z direction) is the vertical direction.

(2) Automated Warehouse

The automated warehouse 1 automatically stores the article that has been transported by the automated guided vehicle 5, and automatically unloads the stored article. The automated warehouse 1 includes racks 11, a stacker crane 13, a loading conveyor 15, and a unloading conveyor 17.

A longitudinal direction of the rack 11 is the Y direction, and a pair of the racks 11 are disposed with intervals in the X direction. The rack 11 has a plurality of article placing portions to place and store the articles, arranged in the X direction and in the Z direction. In this way, the rack 11 can store the article in a matrix in the X and Z directions.

The stacker crane 13 (an example of a transport device) transports the article in the automated warehouse 1. The stacker crane 13 includes a moving cart movable along a travelling rail 13A, and a vertically moving platform movable vertically along a mast of the moving cart and is equipped with a transfer device. The travelling rail 13A is installed in the automated warehouse 1 to extend in the Y direction between two racks 11 facing each other in the X direction. When the moving cart travels along the travelling rail 13A, the stacker crane 13 can transport the article between the article placing portion of the rack 11 and the loading conveyor 15 or the unloading conveyor 17 that are described later. In addition, the stacker crane 13 can transfer the article to or from the article placing portion of the rack 11, the loading conveyor 15, or the unloading conveyor 17, by using the transfer device equipped to the vertically moving platform.

The stacker crane 13 is not limited, but can be any one of various known stacker cranes. The transfer device that is provided to the vertically moving platform to transfer the article can be, for example, a rear hook type device that takes in the article by hooking the rear end thereof, a clamp type device that holds and transfers the article by clamping both sides thereof, a fork type device that scoops and transfers the article with a slide fork, a front hook type device that takes in the article by hooking the front end thereof, or the like.

The loading conveyor 15 transports the articles, which have been transported by the automated guided vehicle 5, to a vicinity of the rack 11. The loading conveyor 15 includes a main conveyor 15A and a sub-conveyor 15B.

The main conveyor 15A is a device that carries the article transported by the sub-conveyor 15B, and transports the article to a vicinity of the rack 11. The article transported to a vicinity of the rack 11 are transported by the stacker crane 13 and are placed on a predetermined article placing portion for storage. The type, the structure, or the like of the main conveyor 15A is not limited. The main conveyor 15A can be one of various conveyors such as a belt conveyor, a chain conveyor, and a roller conveyor, for example.

The sub-conveyor 15B is disposed at an end of the main conveyor 15A in the Y direction, to transport the article, which have been transferred from the automated guided vehicle 5, to the main conveyor 15A.

In this preferred embodiment, the automated guided vehicle 5 enters under the sub-conveyor 15B, and a conveyor main body of the sub-conveyor 15B scoops the article from the automated guided vehicle 5, so that the article is transferred between the automated guided vehicle 5 and the main conveyor 15A. For instance, using a method of moving the sub-conveyor 15B vertically to scoop the article placed on the automated guided vehicle 5 or a method of moving down a lifter provided to the automated guided vehicle 5, on which the article is placed, the article can be transferred from the lifter to the sub-conveyor 15B.

The unloading conveyor 17 is a device to transport the article, which has been transported by the stacker crane 13 for unloading, to a position reached by the automated guided vehicle 5. The unloading conveyor 17 includes a main conveyor 17A and a sub-conveyor 17B.

The article transported by the stacker crane 13 is transferred and placed on the main conveyor 17A. The main conveyor 17A transports the placed article to the sub-conveyor 17B. The main conveyor 17A can be one of various conveyors such as a belt conveyor, a chain conveyor and a roller conveyor.

The sub-conveyor 17B is disposed at an end of the main conveyor 17A in the Y direction, to transfer the article, which has been transported by the main conveyor 17A, to the automated guided vehicle 5.

In this preferred embodiment, the automated guided vehicle 5 enters under the sub-conveyor 17B, and the sub-conveyor 17B moves down the conveyor main body on which the article is placed to the automated guided vehicle 5, and thus the article is transferred from the sub-conveyor 17B to the automated guided vehicle 5.

(3) Work Station

The plurality of work stations 3 are disposed with predetermined intervals in the Y direction with respect to the plurality of automated warehouses 1, and are aligned in the X direction. The work station 3 is a station configured to pick the article for loading or unloading. A worker or a picking robot that performs picking of the article is allocated to the work station 3.

It should be noted that, in a vicinity of the work station 3, there is a space for the automated guided vehicle 5 to wait for entering the work station 3.

As illustrated in FIG. 1, each of conveyors 33 is disposed beside each of the work stations 3. The conveyors 33 join each other at positions apart from the work stations 3 in the Y direction. The conveyor 33 conveys the article picked at the work station 3 to the outside.

As the method of conveying the article picked at the work station 3 using the conveyor 33, there is, for example, a method of picking the article for each destination at the work station 3, so as to convey the picked article to the outside using the conveyor 33.

Other than that, for example, there is a method of picking portions of articles of the same destination at the plurality of work stations 3 to transport them to the outside using the conveyor 33, and then combining the packages of the same destination in the outside.

(4) Automated Guided Vehicle

The plurality of automated guided vehicles 5 are vehicles configured to transport the article and can travel unmanned. The automated guided vehicle 5 travels along a predetermined travel route R. The automated guided vehicle 5 moves with the article placed on an article placing portion provided to the upper portion thereof, to transport the article.

As illustrated in FIGS. 1 and 2, the travel route R is formed in a lattice pattern including a plurality of paths extending in the X direction and a plurality of paths extending in the Y direction between the automated warehouse 1 and the work station 3. In addition, the travel route R extends through the sub-conveyors 15B and 17B. In the travel route R, intersections of the paths extending in the X direction and the paths extending in the Y direction are provided with tags or the like that display identification codes such as QR codes (registered trademark).

The automated guided vehicle 5 moves between the automated warehouse 1 and the work station 3 while detecting the identification codes. When detecting the identification code while moving, the automated guided vehicle 5 determines based on the detected identification code whether or not to change the moving direction at the intersection where the identification code is disposed.

In a travel command of the automated guided vehicle 5, for example, the identification code disposed in the travel route R and information about which direction the automated guided vehicle should move from the intersection where the identification code is disposed, are associated with each other. In addition, the determination whether or not to change the moving direction at the intersection may be performed by the automated guided vehicle 5, or the automated guided vehicle 5 may send an inquiry to a controller 50 described later whether to change the moving direction or not every time when it reaches one of the intersections.

When determining to change the moving direction at the intersection, the automated guided vehicle 5 turns to change the moving direction at the intersection and starts moving straight. In contrast, when determining not to change the moving direction at the intersection, it moves straight without turning. In this way, the automated guided vehicle 5 moves straight and turns as necessary between the automated warehouse 1 and the work station 3, to move along the travel route R of the lattice pattern.

In this preferred embodiment, one automated guided vehicle 5 can also transport both the article for loading and the article for unloading.

Specifically, the automated guided vehicle 5 that transports the article to load from the work station 3 moves along the travel route R in the sub-conveyor 15B to enter the sub-conveyor 15B of the loading conveyor 15 from the front. After that, the sub-conveyor 15B scoops the article to load.

After that, the automated guided vehicle 5 from which the article is scooped moves along the travel route R from the sub-conveyor 15B of the loading conveyor 15, to enter the sub-conveyor 17B of the unloading conveyor 17 from the front or the side. After that, the sub-conveyor 17B places the article to unload on the automated guided vehicle 5. The automated guided vehicle 5 on which the article is placed retreats from the front of the sub-conveyor 17B and transports the article to the work station 3.

As described above, one automated guided vehicle 5 transports both the article for loading and the article for unloading, and hence the automated guided vehicle 5 can transport the article efficiently.

Each of the plurality of automated guided vehicles 5 can only move along the travel route within a predetermined area (referred to as a travel area A1, A2 (FIGS. 5 and 6)) of the entire travel route R. Determination of the travel area A1, A2 is described later in detail.

Figure 3:
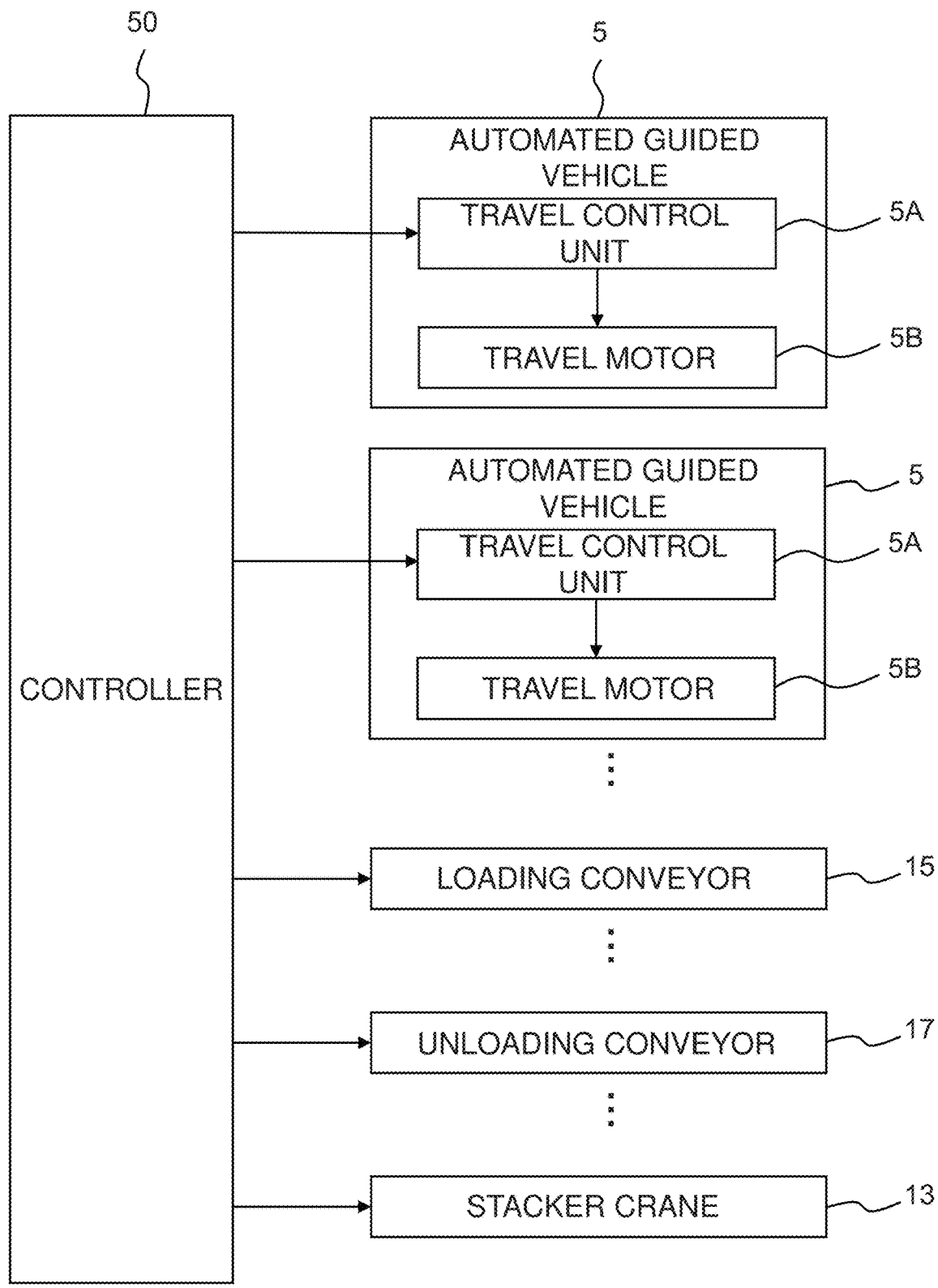
FIG. 3 is a block diagram illustrating a control configuration of the automated warehouse system.

In this preferred embodiment, the automated guided vehicle 5 is an automated guided vehicle (AGV) that travels with wheels rotated by a travel motor 5B (FIG. 3). Other than that, the automated guided vehicle 5 may be a ceiling travel vehicle, a rail guided vehicle, or the like, for example.

It should be noted that, besides the method of disposing the identification codes at the intersections of the paths, it may be possible to form the travel route R using other method such as a method of forming the travel route R using a magnetic tape (a magnet guidance system), or a method of forming the travel route R using a rail (a rail guidance system), for example.

(5) Control Configuration

With reference to FIG. 3, the control configuration of the automated warehouse system 100 is described. FIG. 3 is a block diagram illustrating the control configuration of the automated warehouse system 100.

The automated warehouse system 100 includes the controller 50 as the control configuration of the automated warehouse system 100. The controller 50 is a computer system including a processor (such as a CPU), a storage device (such as a ROM, a RAM, an HDD, or an SSD), and various interfaces (such as an A/D converter, a D/A converter, and a communication interface). The controller 50 executes a program stored in a storage unit (corresponding to a portion of or an entirety of a storage area of the storage device), to perform various control operations in the automated warehouse system 100.

The controller 50 may include a single processor or may include a plurality of processors that are independent from each other to perform each control.

A portion of or an entirety of functions of the controller 50 may be implemented as a program that can be executed by the computer system of the controller 50. Other than that, a portion of functions of modules of the control unit may be a custom IC.

The controller 50 can perform wireless communication with the travel control unit 5A of each automated guided vehicle 5, to send the travel command of each automated guided vehicle 5 to the travel control unit 5A. The travel control unit 5A controls the travel motor 5B of the automated guided vehicle 5 based on the travel command to control movement of the automated guided vehicle 5.

The travel control unit 5A is a computer system including a processor (such as a CPU), a storage device (such as a ROM, a RAM, an HDD, or an SSD), and various interfaces (such as an A/D converter, a D/A converter, and a communication interface).

The controller 50 can perform wireless or wired communication with the loading conveyor 15 (the main conveyor 15A and the sub-conveyor 15B), and the unloading conveyor 17 (the main conveyor 17A and the sub-conveyor 17B), to control transportation of the article by the loading conveyor 15 and the unloading conveyor 17.

Further, the controller 50 can perform wireless or wired communication with the stacker crane 13, to control the stacker crane 13 to load the article to the rack 11 and to unload the article from the rack 11.

(6) Operation of Automated warehouse System

Figure 4:
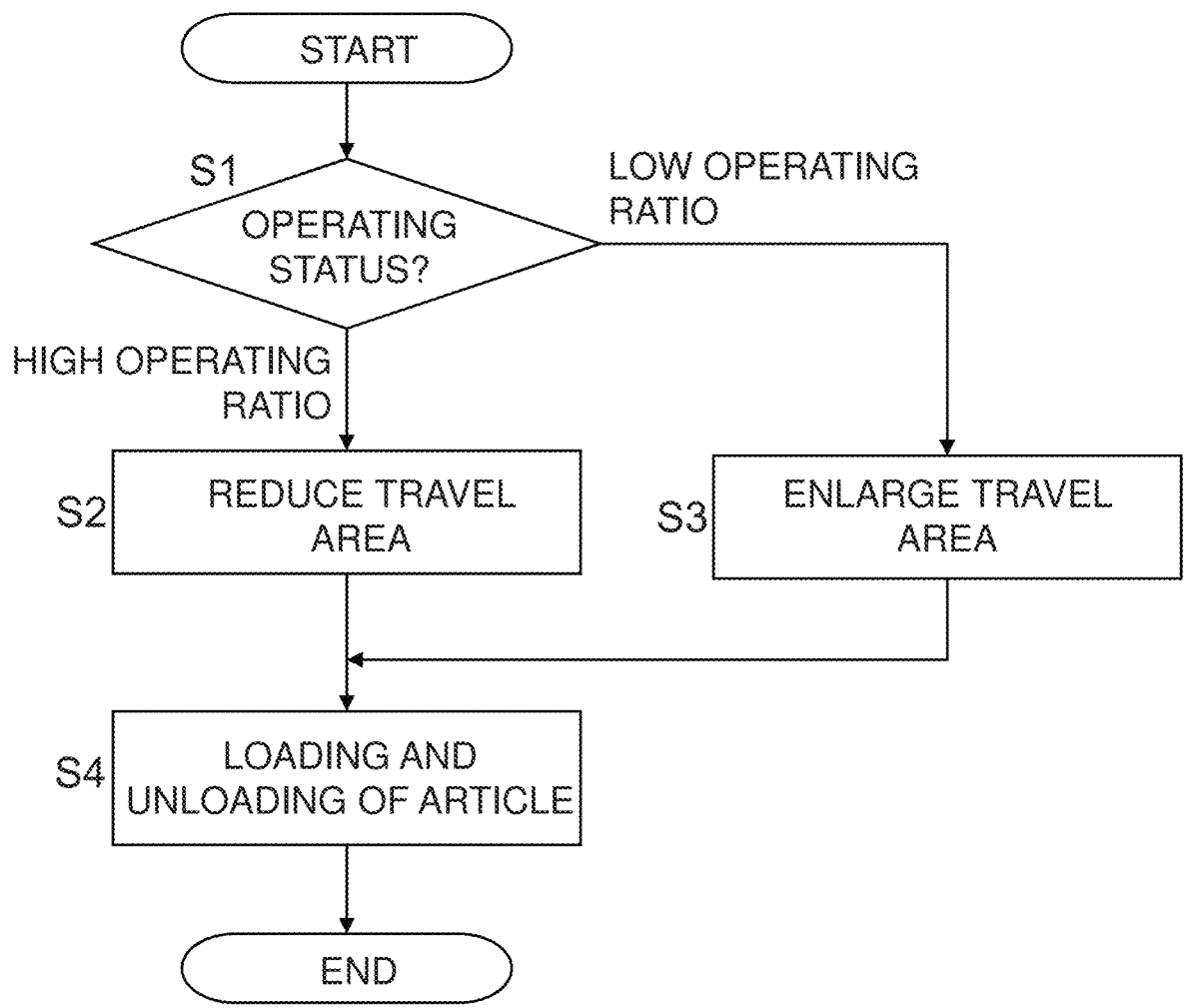
FIG. 4 is a flowchart illustrating an operation of the automated warehouse system.

With reference to FIG. 4, the operation of the automated warehouse system 100 having the structure described above is described. FIG. 4 is a flowchart illustrating the operation of the automated warehouse system 100.

The process illustrated in the flowchart of FIG. 4 is performed by the controller 50. The whole process illustrated in the flowchart of FIG. 4 may be performed by the program stored in the storage device of the controller 50, or a portion of the process may be performed by the program, while the other portion may be performed by hardware of the controller 50.

In addition, a portion of the process illustrated in the flowchart of FIG. 4 (and a related process) may be performed by the controller 50, while the other portion may be performed by another controller.

When the automated warehouse system 100 starts the operation, the travel area A1, A2 of the automated guided vehicle 5 is first determined. The travel area A1, A2 includes at least a portion of the travel route R, and defines a range within which the automated guided vehicle 5 belonging to the travel area A1, A2 can move. In addition, one of the plurality of automated warehouses 1 and one of the plurality of work stations 3 belong to the determined travel area A1, A2. In other words, in this preferred embodiment, every automated warehouse 1 belongs to one of the travel areas A1, A2, and there is no automated warehouse 1 that does not belong to any travel area A1, A2. Specifically, the travel area A1, A2 is determined as follows.

In Step S1, the controller 50 checks the operating status of the automated warehouse system 100 to determine the travel area A1, A2. In this preferred embodiment, the operating status of the automated warehouse system 100 is an operating ratio of the stacker cranes 13 in the automated warehouse 1. The operating ratio of the stacker cranes 13 can be determined based on schedule data that record information about loading and unloading of the article, for example.

For instance, if the schedule data record information about many loading and unloading within a predetermined time range, it is determined that the operating ratio of the stacker cranes 13 in the automated warehouse 1 is high. On the other hand, if information about a few loading and unloading is recorded within the predetermined time range, it is determined that the operating ratio of the stacker cranes 13 is low.

The operating status of the automated warehouse system 100 is not limited to the operating ratio of the stacker cranes 13 in the automated warehouse 1, but it may be an operating ratio of the automated guided vehicle 5 in the travel area A1, A2, for example.

The criteria whether the operating ratio of the stacker cranes 13 or the automated guided vehicle 5 in the automated warehouse system 100 is high or low (e.g., a threshold value of the operating ratio for determining high or low) can be appropriately determined in accordance with a scale of the automated warehouse system 100, a transport capacity of the stacker crane 13 or the automated guided vehicle 5, or the like.

Figure 5:
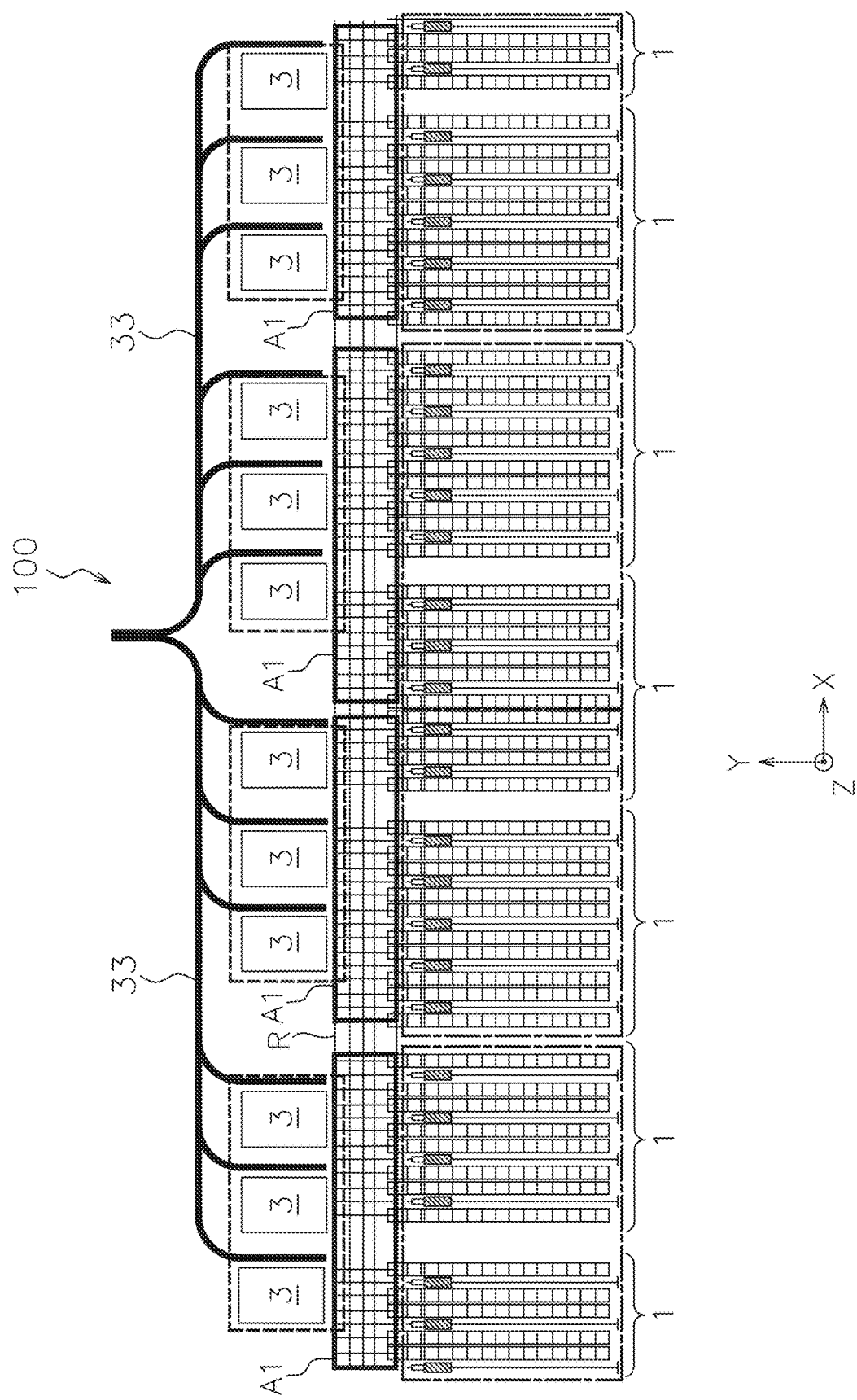
FIG. 5 is a diagram illustrating an example of a case in which small travel areas are determined in the automated warehouse system.

If the operating ratio of the stacker cranes 13 in the plurality of automated warehouses 1 is high as a whole (or if the operating ratio of the automated guided vehicle 5 in the travel area A1, A2 is high as a whole) ("high operating ratio" in Step S1), the controller 50 divides the travel route R into many small travel areas A1 as illustrated in FIG. 5 in Step S2. FIG. 5 is a diagram illustrating an example of a case where the small travel areas A1 are determined in the automated warehouse system 100. In this case, a worker is allocated to each of the plurality of work stations 3.

It should be noted that "the operating ratio is high as a whole" is the state where most of the stacker cranes 13 or the automated guided vehicles 5 are performing the operation to transport the article at relatively high frequency, and there is little or no stacker cranes 13 or automated guided vehicles 5 that are not performing the operation at all or is performing the operation at low frequency.

In the example illustrated in FIG. 5, the travel route R is divided into four small travel areas A1, and each of the small travel areas A1 includes three work stations 3 and seven or eight sets of automated warehouses 1. Substantially the same number of automated guided vehicles 5 belong to each of the travel areas A1. In FIG. 5, the automated warehouses 1 that belong to one travel area A1 are enclosed by a dot-dashed line, and the work stations 3 belonging to one travel area A1 are enclosed by a broken line.

In this way, if the operating ratio of the stacker cranes 13 in the plurality of automated warehouses 1 is high as a whole, i.e., if frequency of loading and unloading of the article is high, by allowing them to move only within the small travel area A1, the automated warehouses 1, the work stations 3, and the automated guided vehicles 5 belonging to the small travel area A1 take charge of many loading and unloading, and thus efficiency of loading and unloading in the automated warehouse system 100 can be improved.

In addition, by allowing the automated guided vehicles 5 to move only within the small travel area A1, it is possible to reduce the distance that the automated guided vehicle 5 moves between the automated warehouse 1 and the work station 3, and the number of turns of the automated guided vehicle 5 at the intersections of the paths. As a result, the transport efficiency of the article of the automated guided vehicle 5 can be improved, so that efficiency of loading and unloading in the automated warehouse system 100 can be improved.

Figure 6:
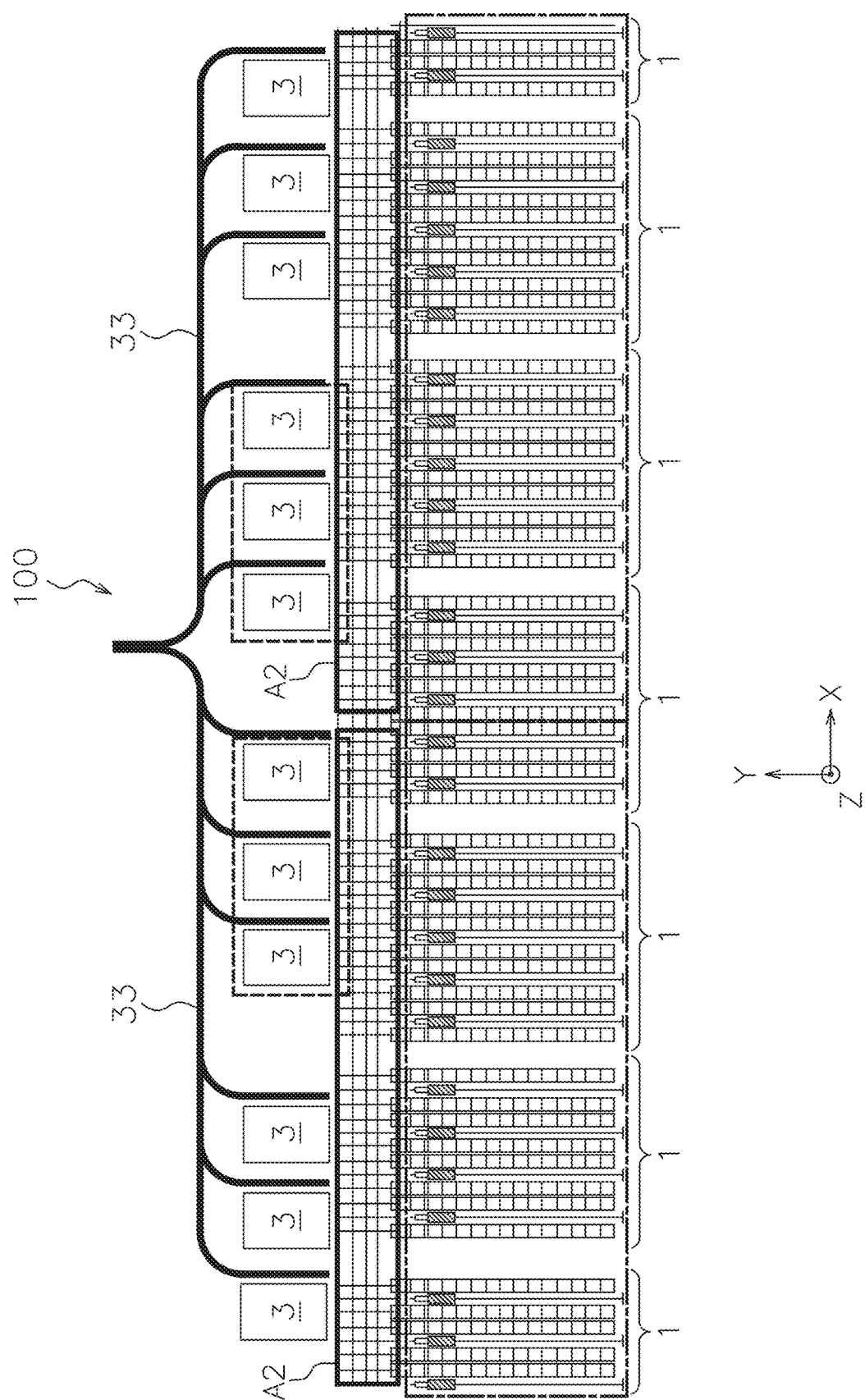
FIG. 6 is a diagram illustrating an example of a case in which large travel areas are determined in the automated warehouse system.

In contrast, if the operating ratio of the stacker cranes 13 in the plurality of automated warehouses 1 is low as a whole (or if the operating ratio of the automated guided vehicles 5 in the travel area A1, A2 is uniformly low) ("low operating ratio" in Step S1), the controller 50 divides the travel route R into large travel areas A2 as illustrated in FIG. 6 in Step S3. FIG. 6 is a diagram illustrating an example of a case where the large travel areas A2 are determined in the automated warehouse system 100.

It should be noted that "operating ratio is low as a whole" is the state where most of the stacker cranes 13 or the automated guided vehicles 5 are performing the operation to transport the article at low frequency or are not performing the same at all, and there are little or no stacker cranes 13 or automated guided vehicles 5 that are performing the operation at high frequency.

In the example illustrated in FIG. 6, the travel route R is divided into two large travel areas A2, and each of the large travel areas A2 includes 14 or 15 sets of the automated warehouses 1. Substantially the same number of automated guided vehicles 5 belong to each of the travel areas A2 before and after changing the travel areas. In FIG. 6, the automated warehouses 1 that belong to one travel area A2 are enclosed by a dot-dashed line, and the work stations 3 that belong to one travel area A2 and are used (i.e. the article is transported by the automated guided vehicle 5) are enclosed by a broken line.

In this way, if the operating ratio of the stacker cranes 13 is uniformly low in the plurality of automated warehouses 1, i.e., if frequency of loading and unloading of the article is low, the influence of the frequency of loading and unloading of the article (the operating status of the automated warehouse system 100) on the operating status of the automated guided vehicle 5 can be reduced, by allowing the automated guided vehicles 5 to move within the large travel area A2 including more automated warehouses 1.

As illustrated by the broken line in FIG. 6, when setting the large travel areas A2, a worker is allocated to three neighboring work stations 3 with respect to one travel area A2. In other words, the number of the work stations 3 belonging to one travel area is hardly changed before and after changing the travel areas, while the number of the automated warehouses 1 that belong to one travel area A2 is increased.

In other words, the controller 50 determines the ratio of the number of the automated warehouses 1 to the number of the work stations 3 that transport the article to or from the automated guided vehicles 5 belonging to the travel area A1, A2, to be larger in the larger travel area A2, before and after changing the size of the travel area A1, A2.

In this way, when the large travel areas A2 are set because of low operating ratio of the automated warehouse 1 and/or the work station 3, the number of the work stations 3 in working state can be reduced in accordance with the decrease in the operating ratio.

It should be noted that, in the example illustrated in FIG. 6, three work stations 3 out of six work stations 3 belonging to each travel area A2 are used, but without limitation, any number (any ratio) of the work stations 3 can be used.

Further in this preferred embodiment, the controller 50 integrates two neighboring small travel areas A1 to generate the large travel area A2 described above. Specifically, in FIG. 5, two neighboring travel areas A1 on the left side in the X direction are integrated to generate the travel area A2, and two neighboring travel areas A1 on the right side in the X direction are integrated to generate the travel area A2.

When integrating the small travel areas to generate the large travel area, it may be possible to integrate three or more neighboring small travel areas. In other words, any number of small travel areas may be integrated to generate the large travel area.

In this way, by integrating the small travel areas A1 to generate the large travel area A2, it is possible to change the size of the travel area A1, A2 by an easy process. The minimum unit of travel area that is used to generate the large travel area A2 is referred to as a "reference area". In this preferred embodiment, the small travel area A1 is the reference area.

As the reference area is the travel area A1, when changing the travel area to be set from the large travel area A2 to the small travel area A1, the controller 50 divides the large travel area A2 into the reference areas to set the travel areas A1.

The number of the automated warehouses 1 and the number of the work stations 3 belonging to the reference area can be determined based on, for example, how many automated warehouses 1 can transport the number of articles that can be processed by one work station 3 without delay.

After setting the travel area A1, A2, the controller 50 commands to start the loading and unloading of the article in the automated warehouse system 100 in Step S4. Specifically, the controller 50 allows the automated guided vehicle 5 belonging to the travel area A1, A2 to transport the article in the set travel area A1, A2, and commands the loading and unloading of the article between the automated warehouse 1 and the work station 3 belonging to the set travel area A1, A2.

By performing Steps S1 to S4 described above, the size of the travel area A1, A2 is determined based on the operating status of the stacker crane 13 of the automated warehouse 1 in the automated warehouse system 100, and the influence of the operating status of the automated warehouse 1 on the operating status of the automated guided vehicle 5 can be reduced. As a result, even if the operating status of the automated warehouse 1 changes, the automated warehouse system 100 can be operated at high efficiency continuously.

(7) Variation 1

In the preferred embodiment described above, the size of the travel area A1, A2 is determined based on the operating status of the stacker crane 13 of the automated warehouse 1, but as Variation 1, the size of the travel area A1, A2 may be determined based on the operating status of the sub-conveyor 15B, 17B of the automated warehouse 1.

For instance, if a retention of the article has occurred in the sub-conveyor 17B for unloading, the retention of the article to unload can be canceled by reducing the travel area to which the automated warehouse 1 including that sub-conveyor 17B belongs, to improve the capacity of unloading the article in the travel area.

(8) Variation 2

In the preferred embodiment and Variation 1 described above, the size of the travel area A1, A2 is determined based on the operating status of the automated warehouse 1, but as Variation 2, the size of the travel area A1, A2 may be determined based on the operating status of the work station 3.

For instance, the size of the travel area A1, A2 can be determined based on the number of operating work stations 3 (the number of the work stations 3 allocated with a worker). For instance, if the number of operating work stations 3 is large, the size of the travel area A1, A2 is reduced such that a capacity of loading and unloading of the article can be improved.

In addition, the size of the travel area A1, A2 can be determined based on a processing state of the article at the work station 3. For instance, if an unprocessed article is retained at the work station 3, the retention of the article can be canceled by increasing the size of the travel area A1, A2 to which the work station 3 belongs.

Further, for example, if the size of the travel area A1, A2 is not changed, or even if the travel area is increased, if there is another work station 3 belonging to the travel area, the retention of the article can be prevented also by transferring the process of the article to the another work station 3.

Further, the size of the travel area A1, A2 can be determined based on both the operating status of the automated warehouse 1 and the operating status of the work station 3. In this case, the contribution ratio of the operating status of the automated warehouse 1 and the operating status of the work station 3 on the size of the travel area A1, A2 may be adjusted, based on which one of the operating status of the automated warehouse 1 and the operating status of the work station 3 is regarded more important.

In addition, for example, the travel area A1, A2 may be determined based on the number of workers who work in the automated warehouse system 100, i.e., the number of the work stations 3 that can be operated.

2. Second Preferred Embodiment

In the first preferred embodiment described above, the travel areas A1, A2 preferably have substantially the same size based on the assumption that the plurality of automated warehouses 1 have substantially the same operating ratio as a whole, for example.

However, without limitation, when setting the plurality of travel areas, if the automated warehouses 1 have respectively different operating ratios, it may be possible to determine the size of the travel area such that the operating status of at least one of the work station 3 and the automated warehouse 1 belonging to each travel area becomes close.

It should be noted that "to determine the size of the travel area such that the operating status becomes close" as described above includes both the case to simply determine the size of the travel area such that the operating statuses are the same or substantially the same, and the case to reduce a difference of the operating status among the plurality of travel areas generated after the travel areas A1 are integrated.

For instance, the size of the travel area to which the automated warehouse 1 and/or the work station 3 having high operating ratio belongs can be small, while the size of the travel area to which the automated warehouse 1 and/or the work station 3 having low operating ratio can be large. In this way, by setting the operating status of the automated warehouse 1 and/or the work station 3 to be close among all the travel areas, the operating status of the automated guided vehicles 5 can be uniform among all the travel areas.

3. Third Preferred Embodiment

Figure 7:
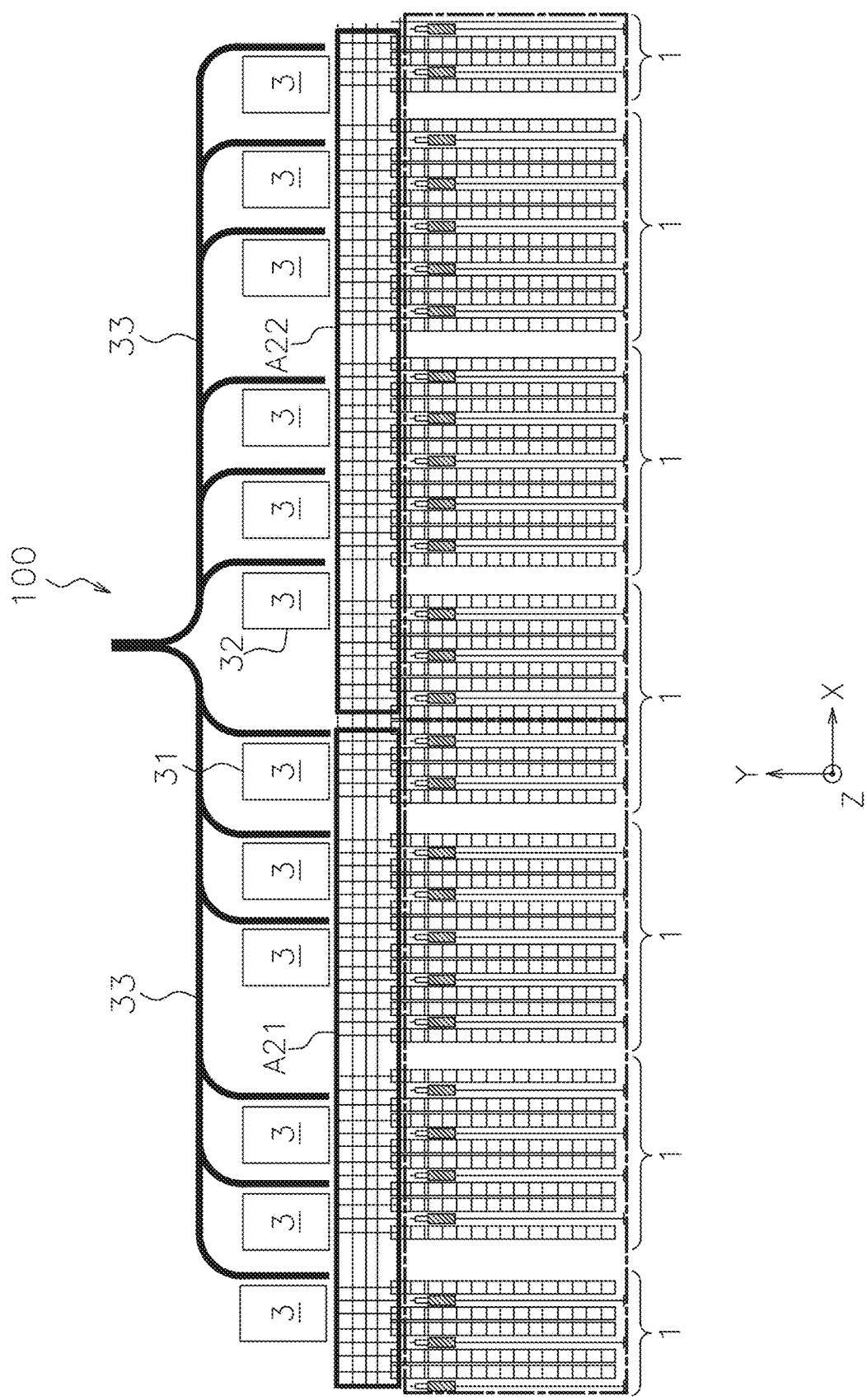
FIG. 7 is a diagram illustrating an example of determining a work station according to a third preferred embodiment of the present invention.

When dividing the travel route R into a plurality of travel areas, the configuration illustrated in FIG. 7 may be adopted, in which the controller 50 determines the neighboring travel areas as a first travel area A21 and a second travel area A22, determines one of the work stations 3 belonging to the first travel area A21, which is located on the side closest to the second travel area, as a first work station 31, determines one of the work stations 3 belonging to the second travel area A22, which is located on the side closest to the first travel area, as a second work station 32, and controls the automated guided vehicle 5 to transport the article between the first work station 31 and the automated warehouse 1 and between the second work station 32 and the automated warehouse 1.

FIG. 7 is a diagram illustrating an example of determining the work station according to the third preferred embodiment.

In this way, the work stations 3 belonging to the two travel areas can be operated by one worker or picking robot, for example. As a result, the number of the workers or the picking robots allocated to the automated warehouse system 100 can be reduced.

For instance, while one of the work stations is operated, the article is retained at the other work station. When the article retained at the other work station reaches a certain amount, the worker or picking robot moves to the other work station. By repeating this operation, one worker or picking robot can operate work stations belonging to different travel areas.

4. Common Features of Preferred Embodiments

The first to third preferred embodiments described above share the following structures and functions.

The automated warehouse system 100 (an example of the automated warehouse system) includes the plurality of automated warehouses 1 (an example of the plurality of automated warehouses), the plurality of work stations 3 (an example of the plurality of work stations), the travel route R (an example of the travel route), the plurality of automated guided vehicles 5 (an example of the plurality of automated guided vehicles), and the controller 50 (an example of the controller).

The travel route R is accessible to the plurality of automated warehouses 1 and the plurality of work stations 3. The automated guided vehicle 5 is movable along the travel route R.

The controller 50 determines an area including at least a portion of the travel route R as the travel area A1, A2 (an example of the travel area) in which the automated guided vehicle 5 travels, and controls the automated guided vehicle 5 to transport an article between the work station 3 and the automated warehouse 1 belonging to the travel area A1, A2.

In addition, the controller 50 determines a size of the travel area A1, A2 in which the automated guided vehicle 5 travels based on the operating status of at least one of the automated warehouse 1 and the work station 3.

In the automated warehouse system 100 described above, the size of the travel area A1, A2 is determined based on the operating status of at least one of the automated warehouse 1 and the work station 3. In this way, influence of the operating status of the automated warehouse 1 and/or the work station 3 of the automated warehouse system 100 on the operating status of the automated guided vehicle 5 can be reduced.

5. Other Preferred Embodiments

Although the plurality of preferred embodiments of the present invention are described above, the present invention is not limited to the preferred embodiments described above, and can be variously modified without deviating from the spirit of the invention. In particular, the plurality of preferred embodiments and variations described in this specification can be arbitrarily combined as necessary.

(A) In the first preferred embodiment described above, the size of the reference area that is the minimum unit of the travel area is the same as that of the small travel area A1. However, without limitation, the reference area may be smaller than the small travel area A1.

(B) Changing of the size of the travel area may be performed in real time based on the operating status with time in the automated warehouse system 100.

(C) If a specific automated guided vehicle 5 belongs to different travel areas before and after the size of the travel area is changed, the automated guided vehicle 5 may automatically move to the travel area to which it belongs after the size of the travel area is changed.

(D) The automated warehouse 1 may be a shuttle warehouse including a shuttle vehicle, which provided at each level of the rack 11 and moves in the length direction of the rack 11 to transport the article, for example.

(E) There may be the automated warehouse 1 that does not belong to any travel area A1, A2. For instance, the automated warehouse 1 having the operating ratio of substantially zero may not belong to any travel area A1, A2.

(F) The travel route R in a vicinity of the work station 3 that is not used in the automated warehouse system 100 may not be included in any travel area A1, A2.

Preferred embodiments of the present invention can be widely applied to automated warehouse systems.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. An automated warehouse system comprising:
a plurality of automated warehouses;
a plurality of work stations;
a travel route accessible to the plurality of automated warehouses and the plurality of work stations;
a plurality of automated guided vehicles capable of traveling along the travel route; and
a controller configured or programmed to determine an area including at least a portion of the travel route as a travel area in which one or more of the plurality of automated guided vehicles travels, and to control the one or more of the plurality of automated guided vehicles to transport an article between one or more of the plurality of work stations and one or more of the plurality of automated warehouses belonging to the travel area; wherein
the controller is configured or programmed to determine a size of the travel area based on an operating status of at least one of the plurality of automated warehouses or the plurality of work stations.

2. The automated warehouse system according to claim 1, wherein
the travel area includes one or more reference areas; and
the controller is configured or programmed to increase the size of the travel area by integrating a plurality of neighboring reference areas into a larger travel area or decrease the size of the travel area by dividing the travel area into smaller travel areas corresponding to the one or more of the reference areas, based on the operating status of at least one of the plurality of automated warehouses or the plurality of work stations.

3. The automated warehouse system according to claim 1, wherein when setting a plurality of the travel areas including the travel area, the controller is configured or programmed to determine the size of the travel area such that a first operating status of at least one of the one or more of the plurality of work stations or the one or more of the plurality of automated warehouses belonging to a first travel area becomes closer to a second operating status of at least one of the one or more of the plurality of work stations or the one or more of the plurality of automated warehouses belonging to a second travel area.

4. The automated warehouse system according to claim 1, wherein the controller is configured or programmed to determine a ratio of a number of the one or more of the plurality of automated warehouses to a number of the one or more of the plurality of work stations to be larger when the size of the travel area is increased than when the size of the travel area is decreased.

5. The automated warehouse system according to claim 1, wherein
the travel area includes a first travel area neighboring a second travel area; and
the controller is configured or programmed to determine one of the one or more of the plurality of work stations belonging to the first travel area, which is located on a side closest to the second travel area, as a first work station, and to determine one of the one or more of the plurality of work stations belonging to the second travel area, which is located on a side closest to the first travel area, as a second work station; and
the controller is configured or programmed to control the one or more of the plurality of automated guided vehicles that travel in the first travel area to transport an article between the first work station and the one or more of the plurality of automated warehouses belonging to the first travel area, and to control the one or more of the plurality of automated guided vehicles that travel in the second travel area to transport an article between the second work station and the one or more of the plurality of automated warehouses belonging to the second travel area.

6. The automated warehouse system according to claim 1, wherein
each of the plurality of automated warehouses includes a transport device to transport the article;
the controller is configured or programmed to reduce the travel area if an operating ratio of the transport device in the plurality of automated warehouses is high, and the controller is configured or programmed to enlarge the travel area if the operating ratio of the transport device in the plurality of automated warehouses is low.

7. The automated warehouse system according to claim 1, wherein the controller is configured or programmed to reduce the travel area if an operating ratio of the plurality of automated guided vehicles is high, and the controller is configured or programmed to enlarge the travel area if the operating ratio of the plurality of automated guided vehicles is low.

8. A method of controlling an automated warehouse system including a plurality of automated warehouses, a plurality of work stations, a travel route accessible to the plurality of automated warehouses and the plurality of work stations, and a plurality of automated guided vehicles capable of traveling along the travel route, the method comprising:
determining an area including at least a portion of the travel route as a travel area in which one or more of the plurality of automated guided vehicles travel; and
controlling the one or more of the plurality of automated guided vehicles to transport an article between one or more of the plurality of work stations and one or more of the plurality of automated warehouses belonging to the travel area; wherein
the travel area has a size determined based on an operating status of at least one of the plurality of automated warehouses or the plurality of work stations.

* * * * *